United States Patent [19]

Shinjo

[11] Patent Number: 5,332,346
[45] Date of Patent: Jul. 26, 1994

[54] CONCRETE ANCHOR

[75] Inventor: Katsumi Shinjo, Osaka, Japan

[73] Assignee: Yugenkaisha Shinjo Seisakusho, Osaka, Japan

[21] Appl. No.: 43,936

[22] Filed: Apr. 8, 1993

[30] Foreign Application Priority Data

Apr. 22, 1992 [JP] Japan .................. 4-130201

[51] Int. Cl.$^5$ .................. F16B 13/04; F16B 13/06
[52] U.S. Cl. .................. 411/31; 411/54; 411/107
[58] Field of Search .................. 411/30, 31, 54, 55, 411/60, 107

[56] References Cited

U.S. PATENT DOCUMENTS

| | | | |
|---|---|---|---|
| 1,762,349 | 6/1930 | Phillips | 411/31 |
| 2,963,935 | 12/1960 | Shields | 411/31 |
| 3,889,570 | 6/1975 | Polos | 411/31 |
| 4,818,163 | 4/1989 | Bereiter et al. | 411/54 X |

FOREIGN PATENT DOCUMENTS 104723 4/1984 European Pat. Off. .......... 411/31

*Primary Examiner*—Neill R. Wilson
*Attorney, Agent, or Firm*—Antonelli, Terry, Stout & Kraus

[57] ABSTRACT

A concrete anchor has an anchor body 21, which is a rod-shaped member 22 having a male thread 23 and a striking head 24, both formed at one end of the member. This rod-shaped member 22 further has at its another end a cylindrical portion 25 so that slots 26 extend axially from an open end of the portion so as to provide expandable feet 27. Saw-toothed scratching tips 28 are formed to be acute ends of the expandable feet. A tapered plug 31 which is inserted in the cylindrical portion 25 has an annular recess 34 and a retaining shoulder 36, both formed between a large diameter portion and a root 35 of the tapered plug, with the annular recess providing a cavity to receive concrete scrapings, so that an impact applied to the striking head can provide a strong and effective retention force for the concrete anchor, and any cracks which may be produced around a hole holding the fixed anchor does not impair the retention force.

5 Claims, 5 Drawing Sheets

CONCRETE ANCHOR

BACKGROUND OF THE INVENTION

1. Field of the Invention

The present invention relates to a concrete anchor capable of being inserted into and fixed in a rough hole which is previously formed in a concrete structure such as a concrete block, a concrete wall or the like, and more particularly relates to an improvement in a concrete anchor whose foot portions extend from an anchor body and will radially and outwardly expand when the body is struck, so as to strongly engage with the inner periphery of the rough hole and secure the body to the concrete structure.

2. Description of Prior Art

FIG. 5 shows a prior art concrete anchor which comprises an anchor body 1 and a tapered plug 8. A male thread 3 and a striking head 4 are formed at one end of a shank 2 which constitutes the anchor body 1. The other end of the shank continues to a cylindrical portion 5 closed at its inner end and opened at its outer end. A plurality of slots 6 axially extend from the open end towards the closed end of the cylindrical portion 5 so as to provide a plurality of expandible feet 7. The tapered plug 8 is set in an axial bore 5a formed through the cylindrical portion. In use, a rough hole 11 will be dug at first in a concrete structure 10, and then the concrete anchor will be inserted into this hole, being led by the cylindrical portion 5 until the lower end of the tapered plug 8 reaches the bottom 11a of said hole. Subsequently, a hammer or any other suitable tool will be used to strike the head 4 towards said bottom, with the tapered plug 8 serving as a wedge to open the expandible feet 7 radially and outwardly. Those feet expanded in this way will claw or strongly engage with the inner periphery 11b of the hole 11 so that this anchor is fixed to the concrete structure. The diameter of the shank 2 is generally equal to that of the male thread 3.

The anchor of the described type composed of only two parts, that is, the anchor body and the tapered plug, is therefore simple in structure and can be manufactured advantageously at a low cost. Further, since the rough hole 11 in the concrete structure 10 can be dug so small as allowing the shank 2 and male thread 3 to be inserted, it is easy to use the concrete anchor of this type in various construction works.

The expandible feet 7 however cannot be opened to a sufficient extent even if a strong initial impact is applied to the striking head 4 of anchor body 1. In addition, the feet 7 of the anchor thus struck may violently scratch the concrete hole and produce a considerable amount of concrete chips or scrapings. Such scrapings will be deposited on the bottom 11a of the hole and hinder the anchor body 1 from taking its deep position, thus failing to strongly fix it to the concrete structure. This will be a more serious problem in a case wherein a vibrational or shocking load is charged to the anchor, because such a load or stress is likely to produce large or small cracks around the rough hole 11, thus impairing the retaining force of this hole in which the concrete anchor has been inserted.

SUMMARY OF THE INVENTION

The present invention was made to improve the prior art anchors advantageous from some viewpoints, and therefore an object of the invention is to provide a concrete anchor to be more of a novel type such that a moderate initial impact to the anchor can produce and maintain a strong detaining force between a rough hole and the concrete anchor, in spite of possible cracks which may take place around the hole after the anchor has been set therein.

This object will be achieved herein by providing a concrete anchor which comprises an anchor body in combination with a tapered plug and is characterized in that saw-toothed scratching tips are formed to be acute ends of expandible feet of the body, and that an annular recess with a retaining shoulder is formed between a large diameter portion and a root of the tapered plug, with the annular recess providing a cavity to receive concrete scrapings.

A relief may preferably be formed on an outer surface of each scratching tip so that, when expandible feet are opened, the tips can scrape easily the inner periphery a rough hole in the concrete structure. It is also preferable to harden those scratching tips and the tapered plug, by quenching them before use. A shank as a middle portion of the anchor body may have annular grooves, one of them being for indication of the rough hole depth in the concrete structure, and the other groove being for indication of the expanded state of the feet. At another end opposite to the expandible feet, the anchor body typically has a male thread, or in lieu thereof, a female thread, a flange or any other conventional means mating any mechanical part or the like.

In operation, an initial impact will be given to a striking head of the anchor inserted in the rough hole. The tapered plug will act like a wedge to expand radially and outwardly the expandible feet of the anchor body, while this body is simultaneously displaced in its entirety towards the bottom of said rough hole. During this process, the saw-toothed tip ends of the feet will scrape the inner periphery of rough hole, to thereby producing 'undercuts' which render easier the full spreading of said expandible feet. As those feet are spread fully and completely, the tapered plug will have its largest-diameter portion retracted inside the saw-toothed scratching tips. In this state, the retaining shoulder is in a fixed engagement with the inner surfaces of the expandible feet which tend to resiliently and centripetally return to their unspread position. Once set in the anchor body, the tapered plug can be separated therefrom no longer. On the other hand, the crushed concrete chips produced by the scratching tips when the anchor body is struck into place will be collected in the annular recess between the end of tapered region and the root of the plug, whereby the anchor body encounters no obstacle until it reaches its deepest position.

BRIEF DESCRIPTION OF THE DRAWINGS

Embodiments are illustrated in the accompanying drawings, in which.

DETAILED DESCRIPTION OF PREFERRED EMBODIMENTS

Figure 1:
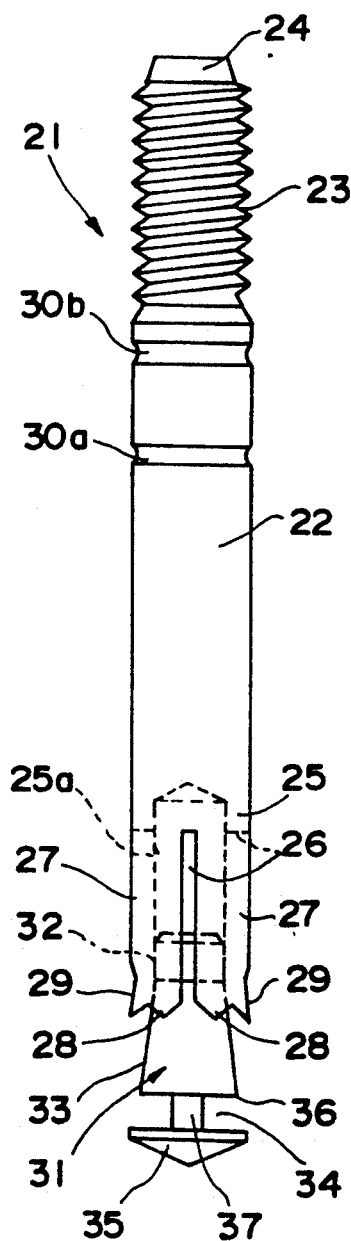
FIG. 1 is a front elevation of a concrete anchor, before use, in a first embodiment of the invention.
Figure 2:
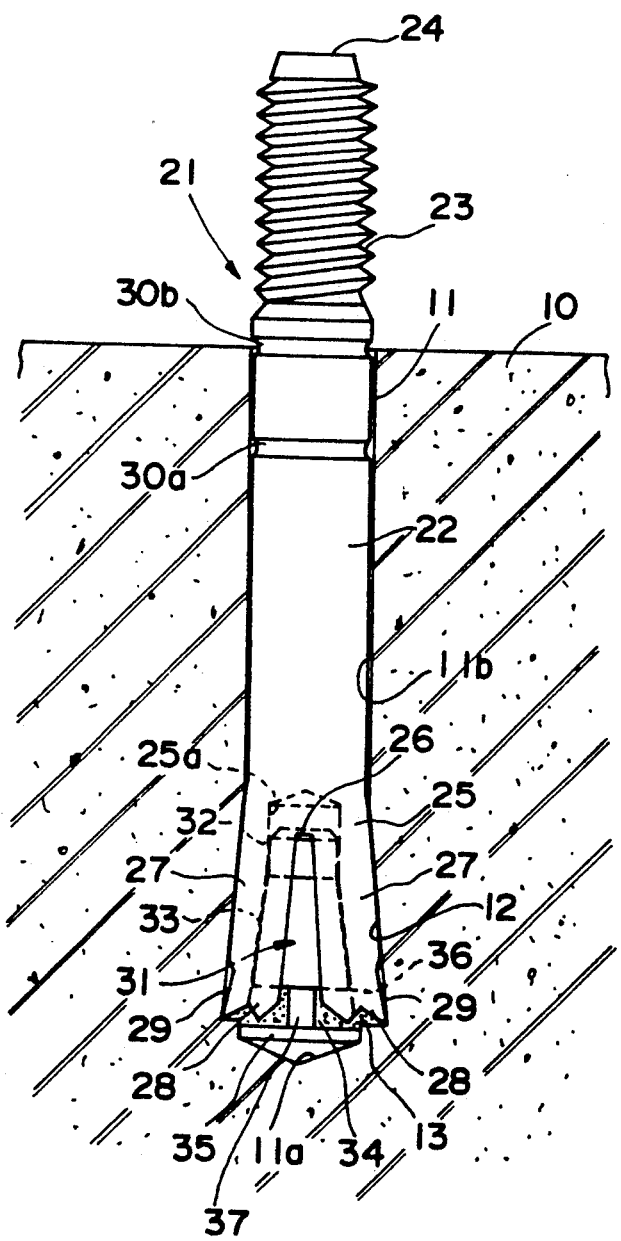
FIG. 2 is a front elevation showing the concrete anchor in use.

FIGS. 1 and 2 show a concrete anchor in a first embodiment, before use and in use, respectively. This concrete anchor comprises an anchor body 21, formed as a rod-shaped member 22 and having at one of its ends a male thread 23 and a striking head 24. At the other end of said body 21, a cylindrical portion 25 is formed to have an open end and a closed end. Four slots 26 extend axially of the cylindrical portion 25 from its open end towards the closed end so that four expandible feet 27 are defined each between two adjacent slots. The rod-shaped member 22 has a diameter generally equal to the outer diameter of the male thread 23. Each expandible foot 27 has, at its extremity, saw-toothed scratching tips 28 whose outer surfaces are slanted inwardly to provide a relief 29. Annular grooves 30a and 30b are formed near the male thread 23 of said body 21, wherein the former groove 30a serves as an indicator showing the inserted depth of this body 21 in a rough hole 11 of a concrete structure. The latter groove 30b serves as another indicator showing that the feet 27 are in their fully spread state caused by the striking of said anchor body 21.

The anchor further comprises a tapered plug 31, which has a short columnar portion 32, a tapered portion 33 extending therefrom and a flange-shaped root 35 connected to the latter portion 33 by a thin and short shaft 37. The columnar portion 32 of this plug is closely fitted in an axial bore 25a of the anchor body's cylindrical portion 25, while the tapered portion 33 of this plug increases its diameter toward the root 35. This root 35 rests on and is supported by a bottom 11a of the rough hole 11. An annular recess for receiving an amount of crushed concrete chips is a cavity or room formed around the short shaft 37 and between an end surface of the tapered portion 33 and an upper surface of the flange-shaped root 35. The end surface is surrounded by a circular edge which defines the largest diameter of said tapered portion 33, wherein the circular edge serves as a retaining shoulder 36 as detailed below.

The saw-toothed scratching tips 28 of the anchor body and the tapered plug 31 are hardened by quenching them before use.

FIG. 2 shows how the concrete anchor thus constructed is used. The anchor led by its tapered plug 31 will be inserted at first into the rough hole 11 previously dug in the concrete structure 10. The depth of said hole must be adjusted in order that the lower annular groove 30a may generally be flush with the outer surface of the concrete structure 10, with the flange-shaped root 35 of the plug being born by the bottom 11a of the hole. Then, the anchor body will be struck downward at its head 24 by a hammer or the like tool so that the tapered portion 33 of the plug acts as a wedge. Thus, the expandible feet 27 will be spread radially outwardly while sliding along the tapered portion 33 toward the hole bottom 11a. During such a motion of the feet, their scratching tip ends 28 will scrape the inner periphery 11b of the hole, to thereby form 'undercuts' which as a whole contribute a tapered recess 12 having its diameter increasing towards the bottom. Consequently, the expandible feet 27 are spread smoothly and come into a strong gripping engagement with the tapered recess 12. In this state, the upper annular groove 30b will be flush with the outer surface of the concrete structure 10, as shown in FIG. 2. In other words, such a position of this groove indicates that the spreading of the feet is finished (that is, the insertion of the struck anchor body is completed). The anchor body 21 is rigidly fixed in this manner to the concrete structure 10. The reliefs 29 above the scratching tips 28 are effective to reduce the resistance of the concrete rough hole against the insertion of the anchor body.

Since the scratching tips 28 assist spreading of the expandible feet 27, the angle of the tapered portion 33 of the plug 31 can be increased twice or more the angle of the prior art plug, for example to be about 10° or greater with respect to its axis. In detail, the diameter of the short columnar portion 32 can be reduced to a remarkable extent to increase the expanded angle of the feet. The inner diameter of the axial bore 25a will be made smaller, with the thickness of said feet 27 being increased correspondingly so as to further improve the retained strength of this anchor. It is also notable that the height of the plug 31 and the length of the slots 26 can be decreased as compared with the prior art ones.

Figure 3:
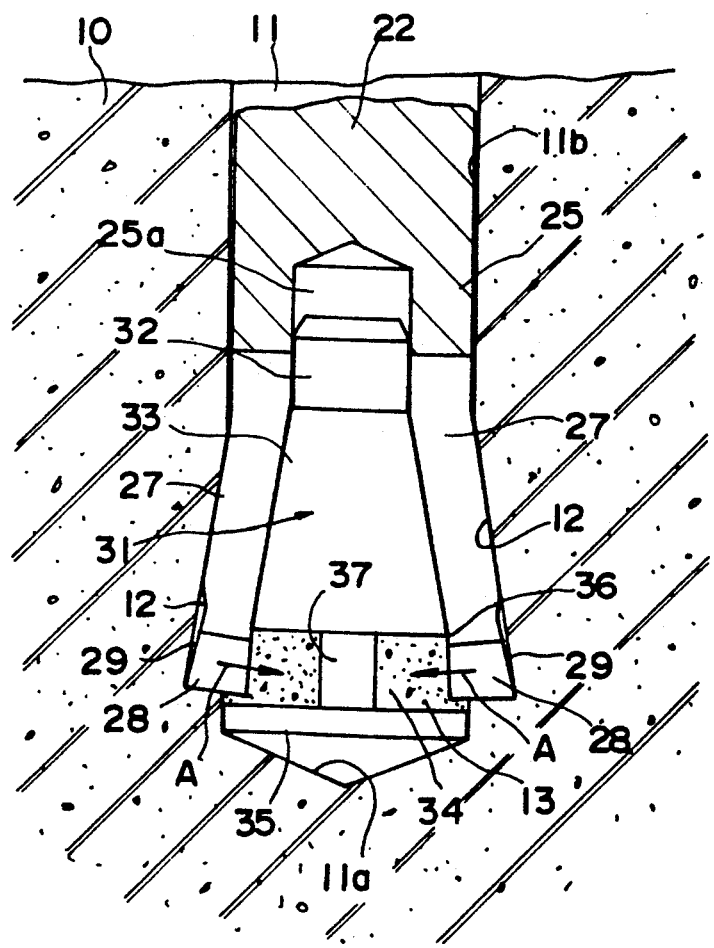
FIG. 3 is an enlarged cross section showing in part the anchor in FIG. 2.

We on the other hand, the concrete chip which will have been crushed by the scratching tips 28 are directed into the annular recess or cavity 34, so that the inward advance of the anchor body 21 will never be hindered by said concrete chips. The expandible feet 27 are thus allowed to be spread smooth and fully, following the forced inward advance of the anchor body. As shown best in FIG. 3, the retaining shoulder 36 defining the largest diameter of the tapered portion 33 of the plug 31 is forcibly positioned beyond the feet extremities, i.e., tips 28 and back into the axial bore. The arrows "A" in FIG. 3 show that the end portions of expandible feet 27 are urged centripetally towards the axis of this anchor, due to their strong elasticity. As a result, the shoulder 36 will bite the inner surface of those end portions of the expandible feed 27, to such an extent that the tapered plug 31 cannot slip off the anchor body 21. It will now be apparent that despite any possible cracks, which the vibrational or shocking load may produce in the wall of the rough hole 11 having the anchor inserted therein, the plug 31 can hold the feet 27 spread.

Figure 4:
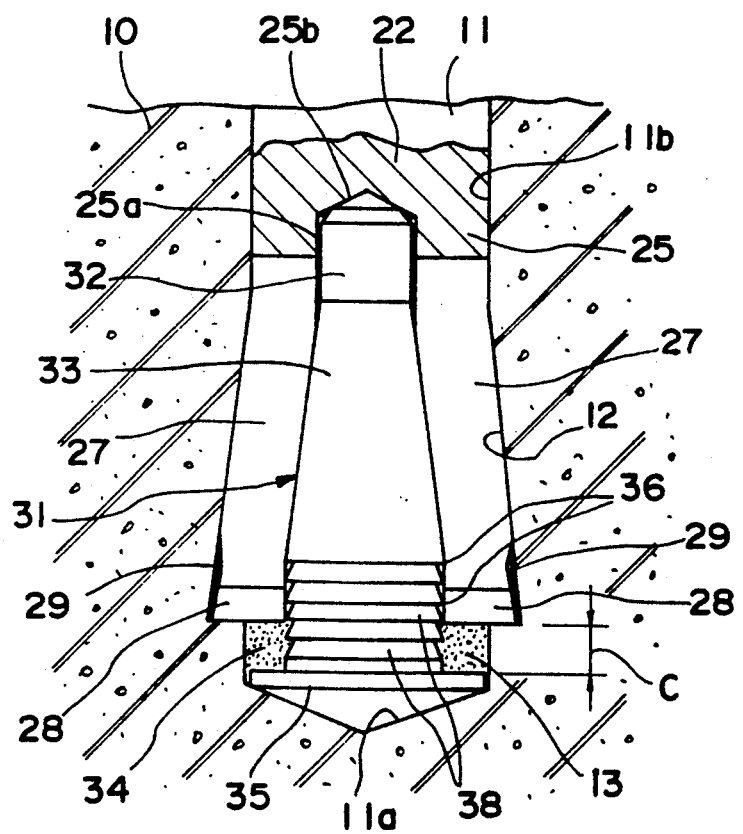
FIG. 4 is a cross section corresponding to FIG. 3, but showing a second embodiment.
Figure 5:
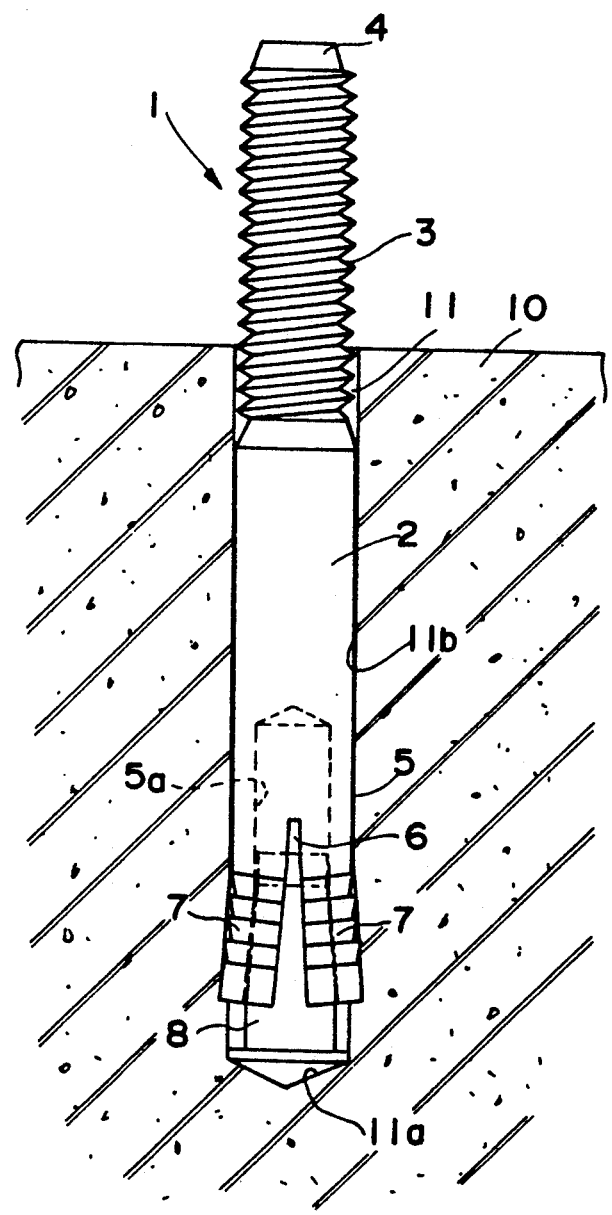
FIG. 5 is a front elevation of the prior art concrete anchor in use.

In a second embodiment shown in FIG. 4, the tapered plug 31 is modified to have an oblique-stepped longer shaft 38 between the tapered portion 33 and the root 35. A plurality of retaining shoulders 36 are thus provided coaxially one with another in this arrangement. Although the rough hole 11 must be dug somewhat deeper in the concrete structure 10, it is not required here to machine an anchor material to form the thin and short shaft and the chip receiving annular recess 34 in a manner as in the first embodiment. Such juxtaposed shoulders are more effective to prevent the slipping of the tapered plug 31. The annular recess 34 to receive the concrete chips in this case will be formed around the oblique-stepped shaft 38 and above the root 35 of the plug, when used as shown in FIG. 4. In order to assure such a space, it is required that the upper surface of the root 35 be a distance "C" away from the lower end of the scratching tips 28, even when the upper end of the short columnar portion 32 of the plug 31 bears against the bottom 25b of the axial bore 25.

In the embodiments described above, the anchor body 21 has at its outer end the male thread 23 to be connected to any mechanical part or the like. However, such a male thread may be replaced with a female thread, a hook, a flange or any other conventional connection means.

In summary, a comparatively weak impact applied to the head is enough for the concrete anchor offered herein to be inserted in and fixed to a concrete body with a strong retention force. Further, any cracks caused by the vibration or shock onto the fixed anchor will not loosen it within the hole of the concrete body. It is also advantageous that this anchor is so simple in structure as enabling the inexpensive and efficient production thereof.

What is claimed is:

1. A concrete anchor comprising an anchor body in combination with a tapered plug, the anchor body comprising:

a connection structure and a striking head formed at one of opposite ends of a rod-shaped member;

a cylindrical portion formed at the other end of the rod-shaped member so as to define an axial bore, and having an open end and a closed end;

slots each extending axially from the open end towards the closed end of the cylindrical portion;

expandable feet each defined between two adjacent slots of the cylindrical portion, the ends of said feet being formed with saw-toothed scratching tips; and the tapered plug having one of opposite ends inserted in the axial bore of the cylindrical portion of the anchor body, wherein said saw-toothed scratching tips are formed to be acute ends of the expandable feet of the body, and an annular recess defined by said tapered plug between a retaining shoulder formed as a circular sharp and acute edge of the largest diameter of a tapered portion of said tapered plug and a root at the other end of the tapered plug, with the annular recess providing a cavity to receive concrete scrapings and said retaining shoulder biting the inner surface of end portions of said expandable feet when the concrete anchor is inserted in and fixed to a concrete body to prevent the tapered plug from slipping off the anchor body.

2. A concrete anchor according to claim 1, wherein a relief is formed on an outer surface of each scratching tip.

3. A concrete anchor according to claim 1 or 2, wherein the scratching tips and the tapered plug are hardened by quenching them before use.

4. A concrete anchor according to claim 1, or 2, wherein the anchor body has at its outer periphery two annular grooves, one of them being for indication of the depth of a rough hole which is dug in a concrete structure so as to receive the concrete anchor, and the other groove being for indication of the expanded state of the expandables feet.

5. A concrete anchor according to claims 1 or 2, wherein a said connection structure is selected from the group consisting of a male thread, a female thread, a hook and a flange.

* * * * *